United States Patent
Home

(10) Patent No.: US 9,383,050 B1
(45) Date of Patent: Jul. 5, 2016

(54) QUICK REMOVAL PLUMBING FITTING

(71) Applicant: GRAND HALL ENTERPRISE CO., LTD., Taipei (TW)

(72) Inventor: William Home, Taipei (TW)

(73) Assignee: GRAND HALL ENTERPRISE CO., LTD., Taipei (TW)

( * ) Notice: Subject to any disclaimer, the term of this patent is extended or adjusted under 35 U.S.C. 154(b) by 0 days.

(21) Appl. No.: 14/920,866

(22) Filed: Oct. 22, 2015

(51) Int. Cl.
F16L 17/00 (2006.01)
F16L 21/08 (2006.01)
F16L 37/12 (2006.01)
F16L 47/12 (2006.01)

(52) U.S. Cl.
CPC .................. *F16L 21/08* (2013.01); *F16L 37/12* (2013.01); *F16L 47/12* (2013.01)

(58) Field of Classification Search
USPC .............................. 285/244, 242, 347, 114, 31
See application file for complete search history.

(56) References Cited

U.S. PATENT DOCUMENTS

| | | | | |
|---|---|---|---|---|
| 3,881,753 A * | 5/1975 | Bochory | F16B 2/245 | 285/114 |
| 4,434,811 A * | 3/1984 | Murdoch | E21B 17/08 | 137/515 |
| 4,811,975 A * | 3/1989 | Paul, Jr. | F16L 37/144 | 285/305 |
| 4,850,622 A * | 7/1989 | Suzuki | F16L 37/0842 | 285/288.1 |
| 5,607,193 A * | 3/1997 | Guest | F16L 37/0925 | 285/308 |
| 5,738,384 A * | 4/1998 | Boehme | F16L 33/18 | 285/114 |
| 6,260,851 B1 * | 7/2001 | Baron | F16L 37/025 | 277/603 |
| 6,508,491 B1 * | 1/2003 | Ebinger | F01N 13/1805 | 285/223 |
| 6,846,023 B2 * | 1/2005 | Ebinger | F16L 37/1225 | 24/563 |
| 7,469,937 B2 * | 12/2008 | Iturgoyen Sabando | F16L 37/1225 | 285/305 |
| 7,614,123 B2 * | 11/2009 | Schweikert | A61M 39/1011 | 24/522 |
| 7,618,069 B2 * | 11/2009 | Lutzke | F16L 37/0985 | 285/305 |
| 7,909,369 B2 * | 3/2011 | Kertesz | F16L 37/0985 | 285/242 |
| 2002/0117853 A1 * | 8/2002 | Bartholomew | F16L 37/098 | 285/305 |
| 2002/0145285 A1 * | 10/2002 | Katayama | F16L 37/0987 | 285/423 |

\* cited by examiner

*Primary Examiner* — Aaron Dunwoody
(74) *Attorney, Agent, or Firm* — Leong C. Lei

(57) ABSTRACT

A quick removal fitting includes a female coupling part, a male coupling part, and a retention clip. The female coupling part includes a flange. The male coupling part (which can be for example a water pipe) has an end forming a divergent opening and includes a protrusion ring mounted thereto and a movable ring movably arranged thereon. The retention clip is made of an elastic material and is selectively set to clamp, in a removable manner, the flange of the female coupling part and the movable ring together. The retention clip that is set to removably clamp the female coupling part and the male coupling part together at a connection therebetween helps simplify assembly/disassembly and replacement. The movable ring that is movably arranged on the male coupling part helps eliminate a mounting operation involving welding.

8 Claims, 7 Drawing Sheets

QUICK REMOVAL PLUMBING FITTING

(a) TECHNICAL FIELD OF THE INVENTION

The present invention relates generally to a fitting, and more particularly to a quick removal water or plumbing fitting that features easy assembly/disassembly, being welding free, easy manufacture, detachment prevention, excellent sealing, and leakage prevention.

(b) DESCRIPTION OF THE PRIOR ART

Devices and systems that are used to convey fluids, such as water conveyance piping systems, running water piping systems, oil pipes, and primary water conduits, are common in the daily living of modern people. Such fluid conveyance systems are composed of pipes between which fittings and other coupling devices may be arranged for the purposes of connection and extension. All the known coupling devices or fittings have to meet a basic and necessary requirement of easy assembly/disassembly and securely sealing and preventing leakage of the fluid flowing in the pipes.

It is, however, no perfect fitting or coupling available in the market to achieve excellent sealing while allowing easy and quick assembly and disassembly.

Referring to FIG. 7, the structure of a conventional plumbing fitting comprises a male coupling part 90 having an end to which a copper fitting part 80 is fixed through welding. The copper fitting part 80 comprises a plurality of sealing rings 81 mounted thereto. The end of the male coupling part 90 can be fit, by means of the copper fitting part 80, into a female coupling part for connection. The sealing rings 81 provide a function of sealing and leakage preventing. However, the copper fitting part 80 must be fixed to the end of the male coupling part 90 by means of welding. This is inconvenient for manufacturing and would increase the cost.

It is thus desired to have a plumbing or water fitting that features easy assembly/disassembly, being free of welding, and easy manufacture, preventing undesired detachment, and excellent sealing and leakage prevention.

The present invention aims to provide a device that overcomes that drawbacks of the prior art devices.

SUMMARY OF THE INVENTION

An object of the present invention is to provide a plumbing fitting that features easy assembly/disassembly, being free of welding, easy manufacture, detachment prevention, excellent sealing, and leakage prevention.

To achieve the above object, the present invention comprises a female coupling part, a male coupling part, and a retention clip. The female coupling part comprises a hollowed portion. The female coupling part has an end comprising a flange. The male coupling part comprises a hollowed portion. The male coupling part has an end receivable in the hollowed portion of the female coupling part. The male coupling part has an end forming a divergent opening and comprises a protrusion ring mounted thereon and a movable ring movably fit over an outer circumference thereof. Two seal rings are respectively arranged at two sides of the protrusion ring. The sealing rings are engageable with an inner circumference of the hollowed portion of the female coupling part. The movable ring has a side face engageable with the flange of the female coupling part. The retention clip is formed of an elastic material and is set to clamp, in a removable manner, the flange of the female coupling part and the movable ring together.

The retention clip that is selectively set to clamp, in a removable manner, the female coupling part and the male coupling part to each other helps achieve easy assembly/disassembly and replacement. The movable ring that is movably fit over the outer circumference of the male coupling part helps eliminate the need for a mounting process involving welding. The divergent opening is provided to constrain the movement of the sealing ring (such as an O-ring seal) arranged on the outer circumference of the male coupling part so as to prevent the sealing ring from undesired separation or detachment. The protrusion ring is provided to retain and position the two sealing rings on opposite sides thereof thereby providing a doubled sealing effect to prevent leakage through the fitting.

The advantages of the present invention are easy assembly/disassembly, being free of welding, easy manufacture, detachment preventing, and good effect of sealing and leakage preventing.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
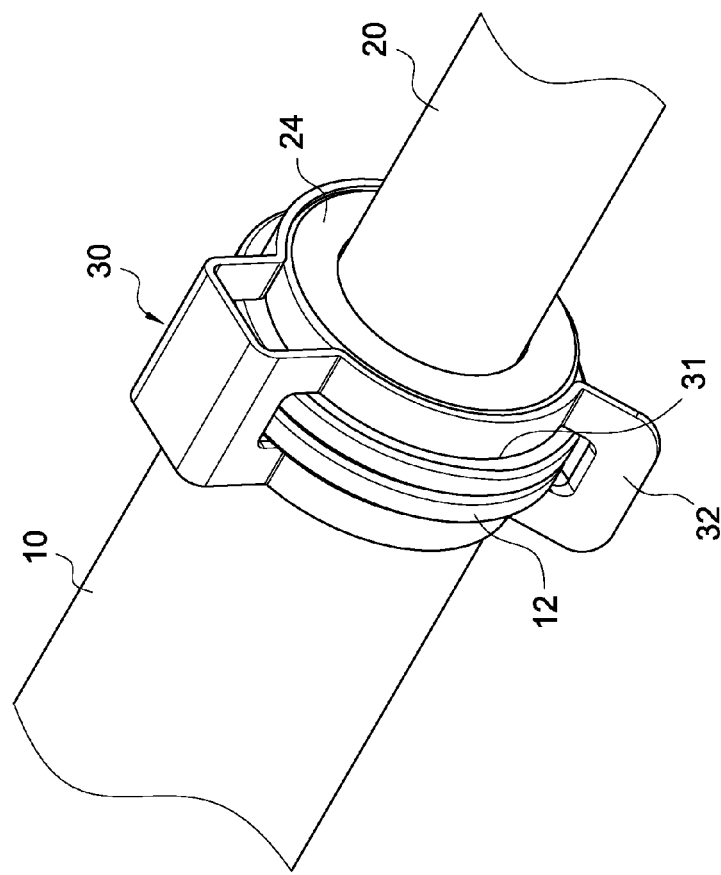
FIG. 1 is a perspective view of the present invention.
Figure 2:
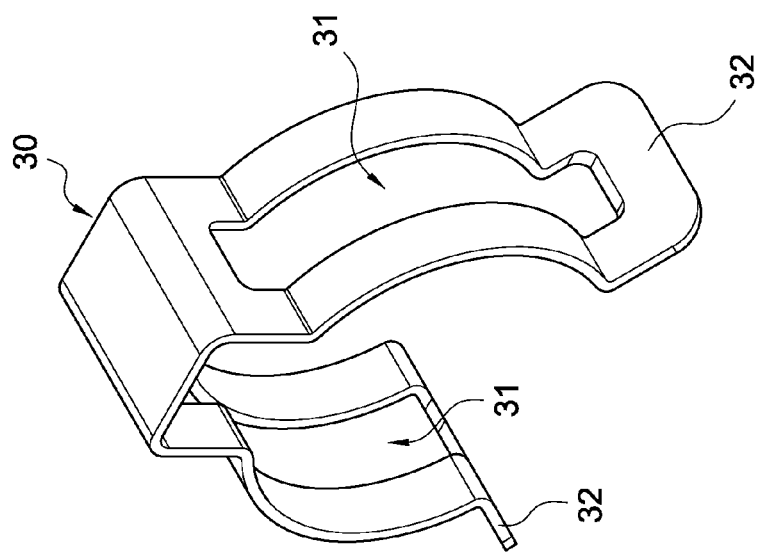
FIG. 2 is a perspective view showing a retention clip according to the present invention.
Figure 3:
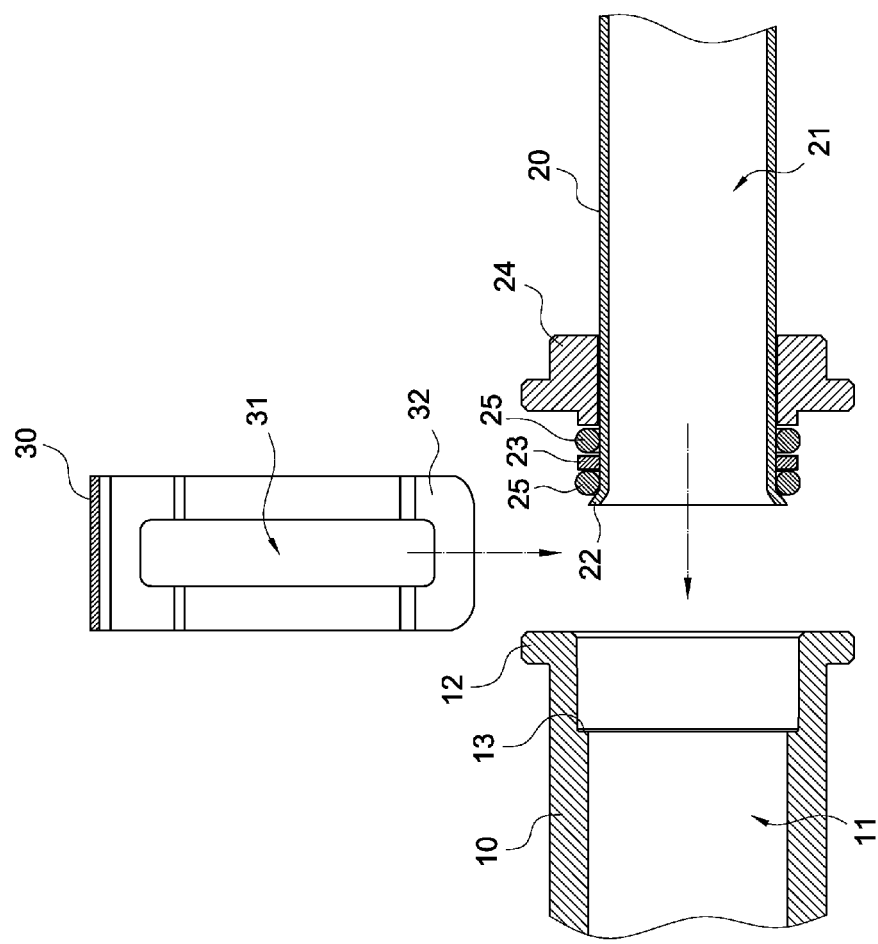
FIG. 3 is a cross-sectional view of the present invention in a separate form for illustrating an assembly process thereof.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1, 2, 4, and 5, a preferred embodiment of the present invention comprises a female coupling part 10, a male coupling part 20, and a retention clip 30. Details will be provided below:

The female coupling part 10 comprises a hollowed portion 11. The female coupling part 10 has an end that comprises a flange 12 formed thereon and extending along an outer circumference thereof.

The male coupling part 20 comprises a hollowed portion 21. The male coupling part 20 has an end receivable into the hollowed portion 11 of the female coupling part 10. The end of the male coupling part 20 is formed as a flaring, expanded, divergent opening 22 and also comprises a protrusion ring 23 formed thereon and extending along an outer circumference thereof and a movable ring 24 movably fit over the outer circumference thereof. Two sealing rings 25 are respectively set on opposite sides of the protrusion ring 23 in such a way that one of the sealing rings 25 is located between the divergent opening 22 and the protrusion ring 23 and the other sealing ring 25 is located between the protrusion ring 23 and the movable ring 24. The sealing rings 25 are sized and shaped to get into contact engagement with an inner circumference of the hollowed portion 11 of the female coupling part 10 and the movable ring 24 has a side face that is movable into contact engagement with the flange 12 of the female coupling part 10 so that a sealing and leakage-preventing effect may be achieved at the connection between the female coupling part 10 and the male coupling part 20.

The retention clip 30 is made of a resilient material and is set in removable engagement with and thus secures the flange 12 of the female coupling part 10 and the movable ring 24 together so as to have the female coupling part 10 and the male coupling part 20 retained and fixed at the connection therebetween, while allowing the retention clip 30 to be opened, through elastic deformation thereof resulting from an external force applied thereto, into a wide open condition for easy assembly/disassembly or installation.

In one embodiment, the hollowed portion 11 of the female coupling part 10 comprises a step 13 formed in an inner circumferential surface thereof to receive the end of the divergent opening 22 of the male coupling part 20 to abut the step 13 to thereby achieve automatic positioning of the male coupling part 20 in insertion into the hollowed portion 11 of the female coupling part 10.

In one embodiment, the female coupling part 10 is formed of a material selected from one of plastic or metal.

In one embodiment, the male coupling part 20 comprises a water pipe.

In one embodiment, the sealing rings 25 are each an O-ring seal.

In one embodiment, the retention clip 30 comprises two through slots 31 formed in two limbs thereof to each partly receive the flange 12 of the female coupling part 10 and the movable ring 24 extending through the through slots 31 thereby achieving an effect of secured retention and coupling and also helping improving the coupling strength at the connection between the female coupling part 10 and the male coupling part 20.

In one embodiment, the retention clip 30 has two opposite ends each comprising a manipulation portion 32. The manipulation portions 32 allows for easy application of a force thereto so that through pulling or pushing the manipulation portions 32, the retention clip 30 can be easily opened, through elastic deformation thereof, to the wide open condition for assembly/disassembly or installation.

In one embodiment, the retention clip 30 is formed of an elastic metal plate.

The structural component of the present invention, and the assembly thereof, has been described above and an embodiment of application and features and advantages of the present invention will be described as follows.

Referring to FIGS. 1, 2, 3, 4, and 5, to install the present invention, an end of the male coupling part 20 is first inserted into the hollowed portion 11 of the female coupling part 10 and the movable ring 24 is moved to such a position where one side face thereof abuts against the flange 12 of the female coupling part 10. Next, the retention clip 30 is applied to clamp the flange 12 of the female coupling part 10 and the movable ring 24 together. As such, the female coupling part 10 and the male coupling part 20 are secured at the connection therebetween without undesired separation and detachment from each other.

Figure 4:
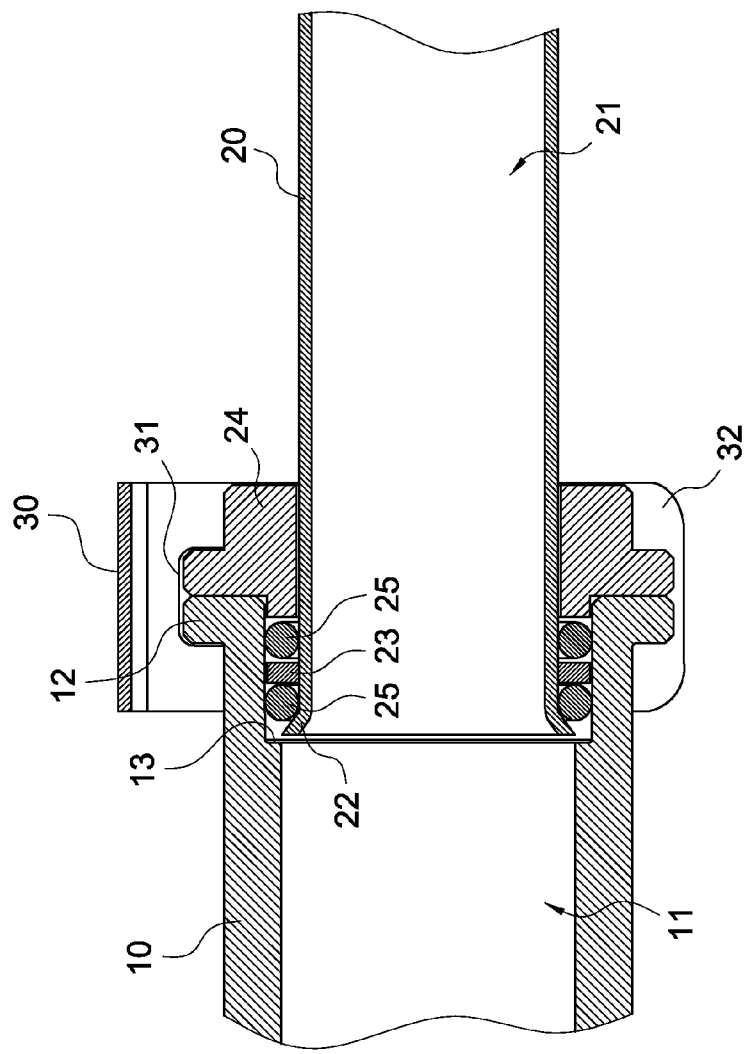
FIG. 4 is a cross-sectional view illustrating the present invention in an assembled form.
Figure 5:
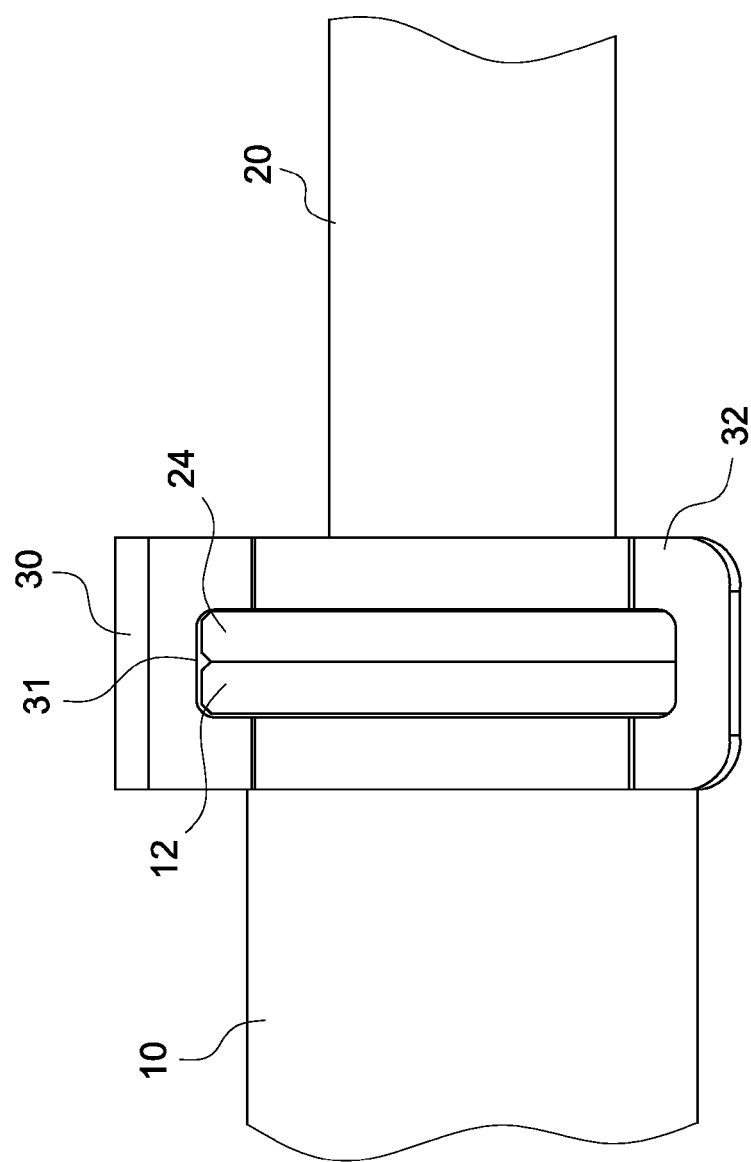
FIG. 5 is a front view of the present invention.
Figure 6:
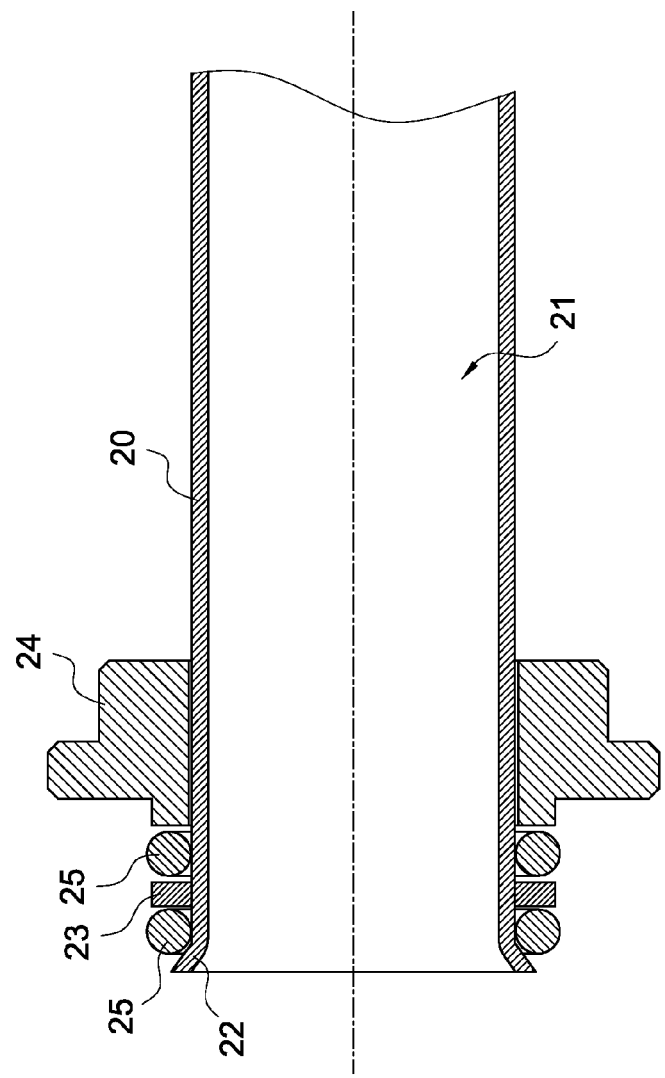
FIG. 6 is a cross-sectional view showing a male coupling part according to the present invention.
Figure 7:
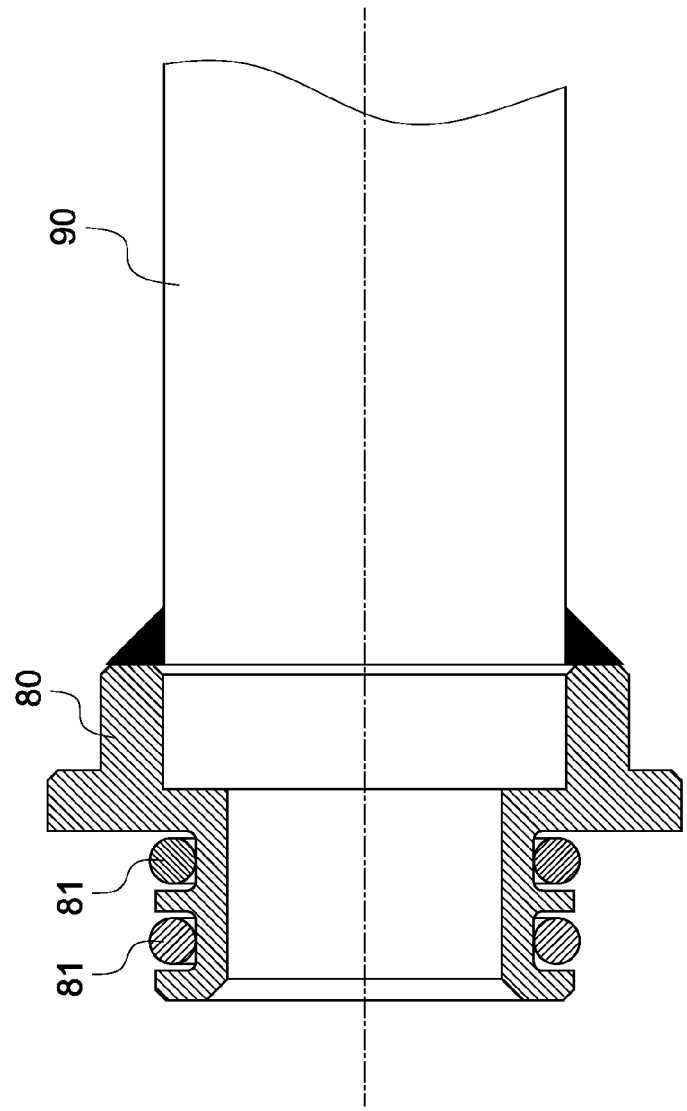
FIG. 7 is a cross-sectional view showing a prior art male coupling part and a copper fitting part.

Referring to FIGS. 4 and 6, the present invention provides a tight engagement and positioning relationship between a divergent openings 22 at one end of the male coupling part 20 and the protrusion ring 23 so as to ensure effective positioning of the sealing rings 25 thereby improving jointing strength between pipes, preventing separation and detachment, and enhancing an air-tight and leakage-preventing effect at the joint between the pipes.

It should be noted here that the present invention comprises the following features:

(1) The retention clip 30 that is elastically deformable is applied to clamp, in a removable manner, the female coupling part 10 and the male coupling part 20 to each other at the connection therebetween so as to achieve easy assembly/disassembly and replacement.

(2) The movable ring 24 is movably fit over the outer circumference of the male coupling part 20 and this eliminates the need for a mounting process involving welding.

(3) The expanded, divergent opening 22 is provided to constrain the movement of the sealing ring 25 (such as an O-ring seal) arranged on the outer circumference of the male coupling part 20 so as to prevent the sealing ring 25 from undesired separation or detachment.

(4) The protrusion ring 23 is provided to retain and position the two sealing rings 25 on opposite sides thereof thereby providing a doubled sealing effect to prevent leakage through the fitting.

The advantages of the present invention are easy assembly/disassembly, being free of welding, easy manufacture, detachment preventing, and good effect of sealing and leakage preventing.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A quick removable fitting, comprising:
a female coupling part, which comprises a hollowed portion, the female coupling part having an end comprising a flange;
a male coupling part, which comprises a hollowed portion, the male coupling part having an end receivable in the hollowed portion of the female coupling part, the male coupling part having an end forming a divergent opening and comprising a protrusion ring formed thereon and a movable ring movably fit over an outer circumference thereof, two sealing rings being respectively arranged on opposite sides of the protrusion ring, the sealing rings being engageable with an inner circumference of the hollowed portion of the female coupling part, the movable ring having a side face engageable with the flange of the female coupling part; and a retention clip, which is formed of an elastic material and is selectively set to clamp, in a removable manner, the flange of the female coupling part and the movable ring together.

2. The quick removal fitting according to claim 1, wherein the hollowed portion of the female coupling part comprises a step formed therein to receive the divergent opening of the male coupling part to engage with the step.

3. The quick removal fitting according to claim 1, wherein the female coupling part is formed of a material selected from one of plastics or metals.

4. The quick removal fitting according to claim 1, wherein the male coupling part comprises water pipe.

5. The quick removal fitting according to claim 1, wherein the sealing rings each are an O-ring seal.

6. The quick removal fitting according to claim 1, wherein the retention clip comprises at least one through slot through which the flange of the female coupling part and the movable ring partly extend to achieve an effect of coupling.

7. The quick removal fitting according to claim 1, wherein the retention clip has two ends each comprising a manipulation portion formed thereon.

8. The quick removal fitting according to claim 1, wherein the retention clip is formed of an elastic metal plate.

\* \* \* \* \*